United States Patent [19]

Kodama et al.

[11] Patent Number: 4,628,770
[45] Date of Patent: Dec. 16, 1986

[54] OVERDRIVE SYSTEM FOR A FOUR-WHEEL DRIVE VEHICLE

[75] Inventors: Masayuki Kodama, Hachiohji; Kenichi Yamada, Mitaka, both of Japan

[73] Assignee: Fuji Jukogyo Kabushiki Kaisha, Tokyo, Japan

[21] Appl. No.: 634,735

[22] Filed: Jul. 26, 1984

[30] Foreign Application Priority Data

Jul. 30, 1983 [JP] Japan ................. 58-139861

[51] Int. Cl.⁴ ............ F16H 3/74; F16H 57/10; F16H 47/08; B60K 17/354
[52] U.S. Cl. .................. 74/752 A; 74/762; 74/688; 74/866; 74/665 GC; 180/247
[58] Field of Search .......... 74/752 A, 752 D, 688, 74/762, 866, 868, 865, 695, 665 GC; 180/247, 250

[56] References Cited

U.S. PATENT DOCUMENTS

| | | | |
|---|---|---|---|
| 3,963,085 | 6/1976 | Vinton | 180/250 X |
| 4,224,837 | 9/1980 | Croswhite | 74/688 |
| 4,298,085 | 11/1981 | Moroto et al. | 180/247 |
| 4,417,641 | 11/1983 | Kageyama | 180/247 |
| 4,428,253 | 1/1984 | Kodama et al. | 74/688 |
| 4,444,073 | 4/1984 | Moroto | 180/247 |
| 4,453,429 | 6/1984 | Toshio | 74/688 |
| 4,462,276 | 7/1984 | Takano | 74/866 |
| 4,466,502 | 8/1984 | Sakai | 180/247 |
| 4,485,886 | 12/1984 | Takano | 180/247 |
| 4,503,927 | 3/1985 | Hayakawa et al. | 74/752 A X |

FOREIGN PATENT DOCUMENTS

| | | | |
|---|---|---|---|
| 039930 | 11/1981 | European Pat. Off. | |
| 50-148757 | 11/1975 | Japan | |
| 56-43035 | 4/1981 | Japan | |
| 56-59049 | 5/1981 | Japan | |
| 57-61843 | 4/1982 | Japan | |
| 0056926 | 4/1983 | Japan | 180/247 |
| 0006452 | 1/1984 | Japan | 180/247 |
| 2104178 | 3/1983 | United Kingdom | 180/247 |

Primary Examiner—Kenneth J. Dorner
Assistant Examiner—Stephen B. Andrews
Attorney, Agent, or Firm—Martin A. Farber

[57] ABSTRACT

An overdrive system for a four-wheel drive vehicle has an automatic transmission the output of which is transmitted to front wheels and to rear wheels through a drive gear and a driven gear and a hydraulically operated four-wheel drive clutch. The system comprises an overdrive clutch for coupling an oil pump drive shaft of the automatic transmission to the driven gear. When the overdrive clutch is engaged, the rotation of the oil pump drive shaft is transmitted to the front wheels through the clutch and driven gear and drive gear for overdriving the vehicle.

9 Claims, 1 Drawing Figure

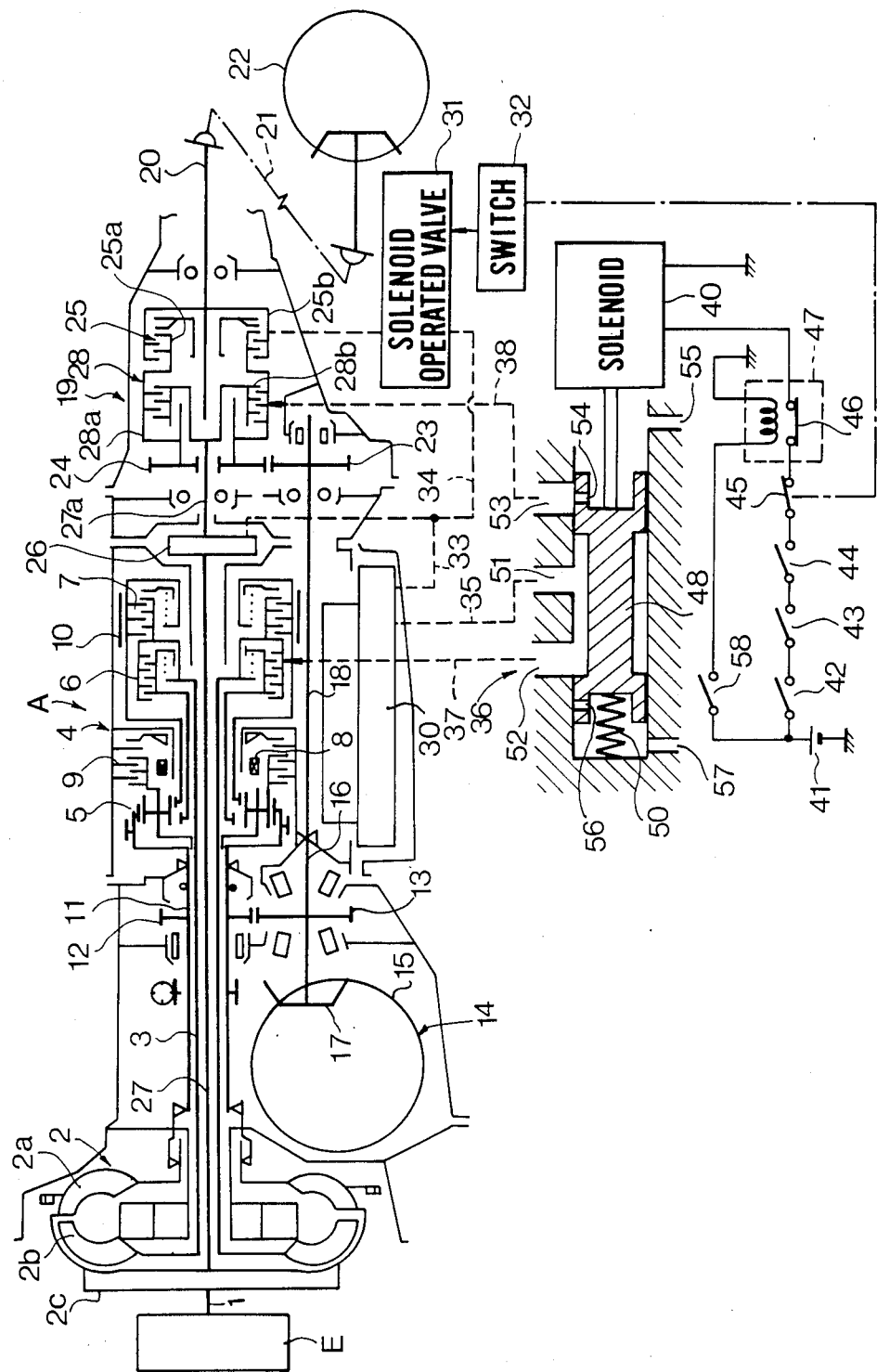

OVERDRIVE SYSTEM FOR A FOUR-WHEEL DRIVE VEHICLE

BACKGROUND OF THE INVENTION

The present invention relates to an overdrive system for a four-wheel drive vehicle having an automatic transmission and a clutch which is manually or automatically engaged to transmit power of an engine to auxiliary driving wheels for establishing a four-wheel driving power transmission.

Generally, the four-wheel driving is used when the vehicle is driven on slippery or icy or snowy roads for safety driving, and the overdriving is hardly used during such four-wheel driving. Accordingly, the overdrive system is provided for two-wheel driving, and it is not necessary to provide for four-wheel driving.

On the other hand, an overdrive device which is directly coupled to the crankshaft of an engine by a lock-up device of a torque converter is desirable for fuel economy. However, in such a system, a lock-up device and a system for operating the lock-up device must be installed, which causes complicated mechanical construction and complex control system. Japanese patent application laid open No. 57-61843 discloses an overdrive system comprising a pair of speed up gears provided on an oil pump drive shaft inherently installed in the automatic transmission and a clutch for establishing the overdrive. However, it is difficult to employ such an overdrive system in a four-wheel drive vehicle which is provided with a transfer device including a clutch for establishing the four-wheel driving, since the transfer device is positioned at a place for installing the overdrive system.

SUMMARY OF THE INVENTION

The object of the present invention is to provide an overdrive system for an automatic transmission which is composed by using a part of a transfer device for auxiliary driving wheels, whereby the system can be simplified in construction.

To this end, the present invention is characterized in that the system comprises an automatic transmission having a main transmission system for transmitting output of an automatic transmission device to main driving wheels, an auxiliary transmission system having a transfer drive shaft for transmitting the output to auxiliary driving wheels through an auxiliary drive shaft, an oil pump operatively connected to a crankshaft of an engine by an oil pump drive shaft. The system further comprises an extension of the oil pump drive shaft, a drive gear secured to the transfer drive shaft, a driven gear rotatably mounted on the extension of the oil pump drive shaft and engaged with the drive gear, a first clutch comprising a third engaging member secured to the first engaging member and a fourth engaging member secured to the auxiliary drive shaft for coupling the driven gear with the extension, a second clutch for coupling the driven gear with the auxiliary drive shaft for transmitting the output to auxiliary driving wheels, first means for disengaging a forward clutch in the automatic transmission device for disconnecting automatic transmission device, second means for engaging the first clutch at the same time as the disengagement of the forward clutch, third means for engaging the second clutch and for establishing four-wheel driving, and fourth means for inhibiting the engagement of one of the first and second clutches when the other is engaged.

Other objects and features of this invention will be apparently understood from the following description with reference to the accompanying drawing.

BRIEF DESCRIPTION OF DRAWING

The single FIGURE is a schematic sectional view of an automatic transmission employed with an overdrive system of the present invention.

DETAILED DESCRIPTION OF THE PREFERRED EMBODIMENTS

Referring to the FIGURE, a crankshaft 1 of an internal combustion engine (E) mounted on a front portion of a vehicle (not shown) is operatively connected with a torque converter 2 of an automatic transmission A.

The automatic transmission A comprises the torque converter 2, an automatic transmission device 4, and a final reduction device 14 for front wheels of the vehicle.

The torque converter 2 comprises a pump impeller 2a and a turbine 2b. The pump impeller 2a is in direct connection with the engine crankshaft 1 through a drive plate 2c. A turbine shaft 3 is extended from the turbine 2b to the automatic transmission device 4.

The automatic transmission device 4 comprises a planetary gear 5, forward clutch 6 and reverse clutch 7 for selectively transmitting the output of the turbine shaft 3 to the planetary gear 5, a one-way clutch 8, a brake 9 and brake band 10 for selectively locking elements of the planetary gear 5.

The output of the automatic transmission device 4 is transmitted to an output shaft 11 on which a drive gear 12 is securely mounted and which in turn engages with a driven gear 13. The driven gear 13 is securely mounted on a shaft 16, on one end of which a drive pinion 17 is formed. The drive pinion 17 engages with a crown gear 15 of the final reduction device 14 for the front wheels. The other end of the shaft 16 is connected to a transfer drive shaft 18 which extends rearwardly and is operatively connected to a rear drive shaft 20 through a transfer device 19. The rear drive shaft 20 is further operatively connected to a final reduction device 22 for rear wheels of the vehicle through a propeller shaft 21.

An oil pump drive shaft 27 is operatively secured to the drive plate 2c, extends passing through the turbine shaft 3 and is connected to an oil pump 26 provided in an end portion of the automatic transmission device 4. The pump drive shaft 27 is connected to an overdrive drive shaft 27a.

The transfer device 19 comprises a drive gear 23 secured to the transfer drive shaft 18, a driven gear 24 rotatably mounted on the overdrive drive shaft 27a, an overdrive clutch 28, and a rear-wheel drive clutch 25. Each of the clutches 28 and 25 is a hydraulically operated friction clutch. The clutch 28 comprises an engaging member 28a secured to the driven gear 24 and an engaging member 28b secured to the overdrive drive shaft 27a. The clutch 25 comprises an engaging member 25a secured to the engaging member 28a and an engaging member 25b secured to the rear drive shaft 20.

Pressurized oil from the oil pump 26 is supplied to a control valve block 30 through a passage 33 and to a pressure chamber of the rear-wheel drive clutch 25 through a passage 34 and a solenoid operated valve 31. The valve block 30 supplies pressurized oil to the forward clutch 6 through a passage 35, a solenoid operated directional control valve 36 and a passage 37, and to the overdrive clutch 28 through a passage 38. The valve block 30 also supplies pressurized oil to other devices such as the reverse clutch 7 and brake 9. A solenoid 40 for operating the directional control valve 36 is connected to a battery 41 through an overdrive switch 42, D-range switch 43, governor switch 44, inhibitory switch 45 and normally closed switch 46 of a kickdown relay 47. The inhibitory switch 45 is adapted to be operated in dependency on the operation of a four-wheel drive switch 32. A spool 48 of the valve 36 is held at the illustrated position by a spring 50. Pressurized oil from the valve block 30 is supplied to the forward clutch 6 through passage 35, valve ports 51, 52 and passage 37 to engage the clutch 6. Oil in a pressure chamber of the clutch 28 is drained through the passage 38, a port 53, and a passage 54 formed in the spool 48 and a drain port 55. When the solenoid operated valve 31 is closed, the output of the automatic transmission is transmitted to the front wheels through the drive pinion 17 and final reduction device 14, thereby driving the vehicle by the front wheels.

For example, in the D-range (driving range) of the automatic transmission, engagement of clutch 6 establishes forward driving condition. Engagement of the one-way clutch 8 provides a 1st speed transmission and applying of the brake band 10 provides a 2nd speed transmission. When clutch 7 is engaged, a 3rd speed is established.

When the four-wheel drive switch 32 is manually operated to open the solenoid operated valve 31, oil is supplied to the clutch 25 to engage it. Thus, the output of the automatic transmission is transmitted to the rear wheels through the gears 23 and 24, clutch 25 and shafts 20 and 21, thereby establishing four-wheel driving.

In the D-range, the D-range switch 43 is closed. The inhibitory switch 45 is closed if the four-wheel drive switch 32 is not operated, which means the transmission is in two-wheel drive. The governor switch 44 is closed, when vehicle speed exceeds a predetermined value, for example 60 km/h. Accordingly, under conditions of two-wheel driving in D-range at a speed higher than the predetermined speed, when the overdrive switch 42 is closed by manual operation or accelerator pedal operation, solenoid 40 is excited, so that the spool 48 is moved to the right. At the right position of the spool 48, oil in the pressure chamber of the forward clutch 6 is drained through passage 37, port 52, passage 56 formed in the spool 48, and drain port 57. Accordingly, the clutch 6 is disengaged, so that the automatic transmission 4 does not operate. On the other hand, port 51 is communicated with port 53. Thus, pressurized oil is supplied to the pressure chamber of the overdrive clutch 28 to engage it. Thus, rotation of overdrive drive shaft 27a is transmitted to the front wheels through clutch 28, speed up gears 24, 23, shafts 18, 16 and pinion 17. Accordingly, the vehicle is overdriven directly from the crankshaft with speed up gears 24, 23. When a kickdown switch 58 is closed by kickdown operation of the accelerator pedal during the overdrive, the relay 47 is energized to open the switch 46. Thus, solenoid 40 is deenergized to shift the spool to the left, so that the clutch 6 is engaged and clutch 28 is disengaged. Accordingly, the automatic transmission operates to drive the vehicle.

If the switch 32 is operated for the four-wheel drive, the inhibitory switch 45 is opened. Accordingly, if the overdrive switch 42 is closed during four-wheel driving, the overdrive clutch 28 is not engaged.

The following table shows operations of the clutches and brakes, in which "C" and "B" designate clutch and brake, and the suffix added to the abbreviation is the numeral used in the FIGURE, and the mark "O" means the operation.

|  | Speed | $B_9$ | $C_8$ | $C_6$ | $B_{10}$ | $C_7$ | $C_{28}$ | $C_{25}$ |
|---|---|---|---|---|---|---|---|---|
| Front Wheel Drive | 1 |  | O | O |  |  |  |  |
|  | 2 |  |  | O | O |  |  |  |
|  | 3 |  |  | O |  | O |  |  |
|  | O.D |  |  |  |  |  | O |  |
| 4 WD | 1 |  | O | O |  |  |  | O |
|  | 2 |  |  | O | O |  |  | O |
|  | 3 |  |  | O |  | O |  | O |

As described above, since the overdrive device is provided by using a part of the transfer device for auxiliary driving wheels, the system of the present invention can be simplified in construction.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In an overdrive system for a four-wheel drive vehicle having an automatic transmission, the transmission having an automatic transmission device and a torque converter for transmitting power of an engine to said automatic transmission device, the latter comprising a forward clutch and a planetary gear operatively connected to the forward clutch, the automatic transmission further comprising a main transmission system for transmitting an output of said automatic transmission device to main driving wheels, the overdrive system including an auxiliary transfer system having a transfer drive shaft for transmitting the output to auxiliary driving wheels through an auxiliary drive shaft, the automatic transmission including an oil pump operatively connected to a crankshaft of said engine by an oil pump drive shaft, the improvement of the overdrive system wherein:

the auxiliary transfer system comprises:
an extension of said oil pump drive shaft;
a drive gear secured to said transfer drive shaft;
a driven gear rotatably mounted on said extension of said oil pump drive shaft and engaged with said drive gear;
a first clutch means comprising a first engaging member secured to the driven gear and a second engaging member secured to the extension for coupling said driven gear with said extension upon engagement of said engaging members; and
a second clutch means comprising a third engaging member secured to the first engaging member and a fourth engaging member secured to the auxiliary drive shaft for coupling said driven gear with said auxiliary drive shaft upon engagement of said third and fourth engaging members for transmitting the output to the auxiliary driving wheels;
the overdrive system further comprises:
first means for disengaging said forward clutch in said automatic transmission device for disconnecting the latter;

second means for engaging said first clutch means by engaging said first and second engaging members at the same time as the disengaging of said forward clutch providing overdriving;

third means for engaging said second clutch means by engaging said third and fourth engaging members for establishing four-wheel driving at a time when said forward clutch is engaged; and fourth means for inhibiting engagement of both of said first and second clutch means at the same time.

2. The overdrive system according to claim 1 wherein said drive gear and driven gear are so arranged to form a speed up gear device when the driven gear drives the drive gear.

3. The overdrive system according to claim 1 wherein said first and second clutch means are hydraulically operated friction clutches.

4. The overdrive system according to claim 3 wherein said first, second, third and fourth means comprise a solenoid operated directional control valve for controlling oil supplied to said first clutch means and switches for operating a solenoid for said directional control valve, and a solenoid operated valve for controlling said second clutch means.

5. The overdrive system according to claim 4 wherein said switches comprise an overdrive switch for providing the overdrive, a driving range switch which is closed when the automatic transmission is in driving range, a governor switch which is closed when vehicle speed is higher than a predetermined value, and an inhibitory switch which is opened when said second clutch means is engaged.

6. The overdrive system according to claim 1, further comprising
means for preventing engagement of said first clutch means when said forward clutch is engaged.

7. The overdrive system according to claim 6, further comprising
means for preventing engagement of said second clutch means when said forward clutch is disengaged.

8. The overdrive system according to claim 1, further comprising
means for preventing engagement of said second clutch means when said forward clutch is disengaged.

9. In an overdrive system for a four-wheel drive vehicle having an automatic transmission for transmitting power of an engine and a main transmission system for transmitting an output of said automatic transmission to two main driving wheels of the vehicle, the overdrive system including an auxiliary transfer system having a transfer drive shaft for transmitting the output to two auxiliary driving wheels of the vehicle through an auxiliary drive shaft, the improvement of the overdrive system wherein:

the auxiliary transfer system comprises:

a drive gear secured to said transfer drive shaft;

a driven gear rotatably mounted on a member operatively driven by a crankshaft of the engine, said driven gear being engaged with said drive gear;

first clutch means comprising a first engaging member secured to the driven gear and a second engaging member secured to the member for coupling said driven gear with said member upon engagement of said engaging members; and second clutch means comprising a third engaging member secured to the first engaging member and a fourth engaging member secured to the auxiliary drive shaft for coupling said driven gear with said auxiliary drive shaft upon engagement of said third and fourth engaging members for transmitting the output to the auxiliary driving wheels;

the overdrive system further comprises:

control means for disengaging said automatic transmission and engaging said first clutch means providing overdriving, said control means for engaging said automatic transmission and said second clutch means for four-wheel driving, and said control means for engaging said automatic transmission for disengaging said first and second clutch means for driving only with said main driving wheels, respectively, and said control means further for inhibiting engagement of both of said first and second clutch means at the same time.

* * * * *